Dec. 8, 1931.   H. L. HORNING   1,835,302
INTERNAL COMBUSTION ENGINE
Filed Jan. 29, 1930    3 Sheets-Sheet 2

Inventor
Harry L. Horning
By Brown, Jackson, Boettcher & Dienner
Attys

Dec. 8, 1931.  H. L. HORNING  1,835,302
INTERNAL COMBUSTION ENGINE
Filed Jan. 29, 1930  3 Sheets-Sheet 3

Inventor
Harry L. Horning
By Brown, Jackson, Boettcher & Dienner.
Attys

Patented Dec. 8, 1931

1,835,302

UNITED STATES PATENT OFFICE

HARRY L. HORNING, OF WAUKESHA, WISCONSIN, ASSIGNOR TO WAUKESHA MOTOR COMPANY, OF WAUKESHA, WISCONSIN, A CORPORATION OF WISCONSIN

INTERNAL COMBUSTION ENGINE

Application filed January 29, 1930. Serial No. 424,189.

This invention relates to internal combustion engines, and has to do more particularly with the combustion chamber and the appurtenances thereof.

One of the main objects of my invention is to provide a combustion chamber so constructed and related to the cylinder area and the piston as to produce high turbulence and promote flame propagation. Further objects and advantages of my invention will appear from the detailed description.

In the drawings:—

Figure 1:
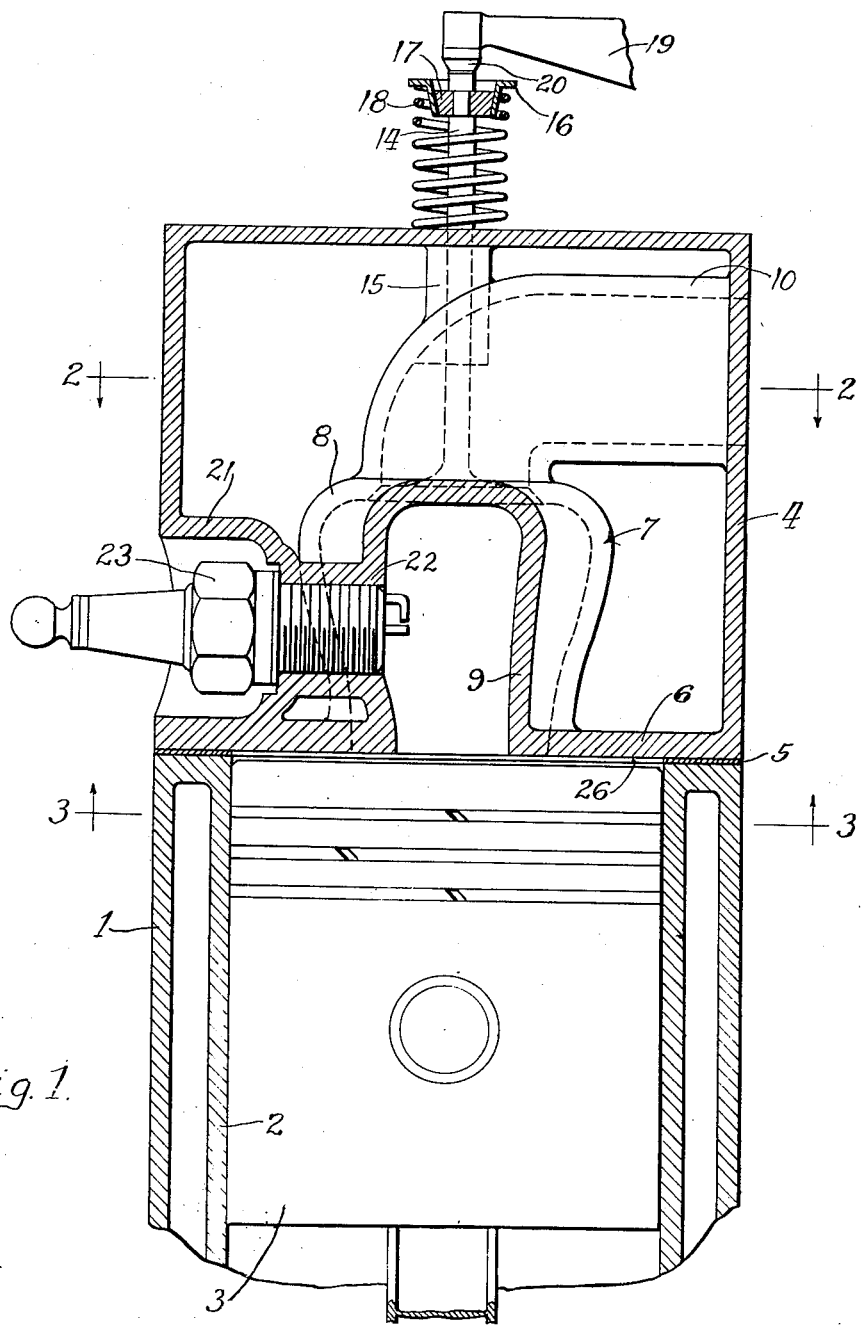
Fig. 1 is a vertical sectional view through the head and the upper portion of the cylinder block of an engine embodying my invention, taken substantially on line 1—1 of Fig. 3.

I have illustrated my invention, by way of example, as applied to an internal combustion engine comprising a cylinder block 1, a cylinder 2 suitably supported within the block, a piston 3 reciprocating in the cylinder, and a head 4 secured upon the block in a known manner, a gasket 5 being interposed between the upper face of the block and the lower face of head 4. The head and the cylinder block are cored out, where feasible, for circulation therethrough of a cooling liquid, in a known manner.

Figure 2:
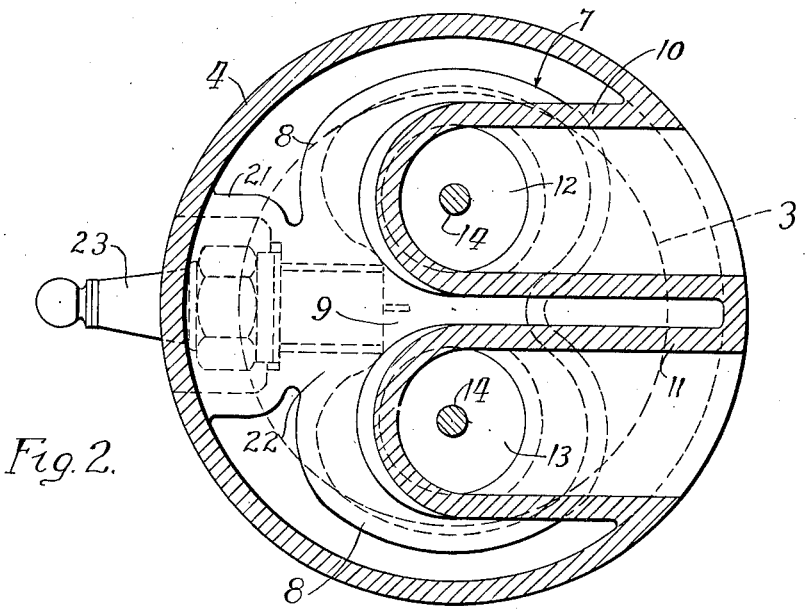
Fig. 2 is a section taken substantially on line 2—2 of Fig. 1.
Figure 3:
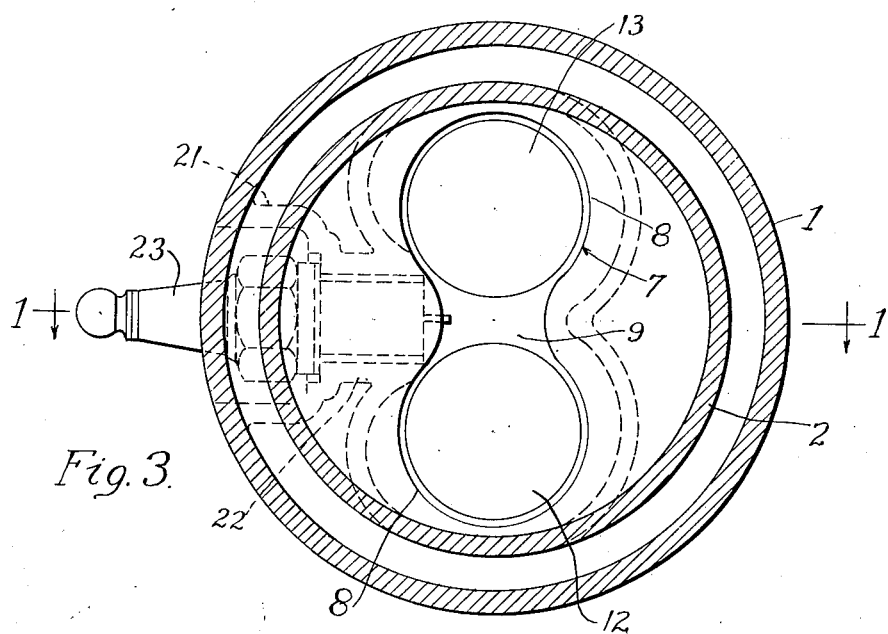
Fig. 3 is a section taken substantially on line 3—3 of Fig. 1, the piston being omitted for clearness of illustration.

Head 4 is provided with a lower wall 6 the under face of which is flat or planar, and this wall overlies the cylinder area closely adjacent the upper end thereof. The head also includes a combustion chamber 7 which opens through wall 6 directly into the cylinder area. This chamber comprises end portions 8 and a restricted neck 9 connecting these end portions. Referring more particularly to Figs. 2 and 3, chamber 7 is disposed with its longer axis diametrically of the cylinder, and the end portions 8 of the chamber are positioned adjacent the periphery of the cylinder area at diametrically opposite points thereof. The head is provided with fuel mixture inlet and burnt gas outlet passages 10 and 11, conveniently formed integrally with the head, which open through the roof of chamber 7 at each end thereof. These passages are controlled by overhead valves 12 and 13. Stem 14 of each valve operates through a guide member 15 conveniently formed integral with the associated passage wall and the top wall of the head. In Fig. 1, I have shown a guide member 15 integral with the inlet passage wall 10 and connecting the inlet passage to the top wall of the head. A spring seat washer 16 is suitably secured on valve stem 14, adjacent the upper end thereof, by a key 17, in a known manner. An expansion coil spring 18 is mounted about the valve stem and is confined between the spring seat washer 16 and the top wall of the cylinder head. This spring acts, in a known manner, to urge the valve in closing direction.

For opening the valve, a suitably mounted rocker lever 19 is provided, this lever having a tappet 20 which contacts the upper end of the valve stem 14. This lever and the method of operation thereof are well known in the art and need not be illustrated nor described in detail, it being sufficient to note that the valves are operated in proper timed relation by rocker levers, or other suitable means well known in the art.

As will be noted more clearly from Fig. 1, the combustion chamber 7 flares upwardly and the end portions 8 of this chamber are substantially concentric with the valves 12 and 13, as shown more clearly in Figs. 2 and 3. Referring more particularly to Fig. 3, the lower portion of the combustion chamber 7, which opens through wall 6 of the head, is of substantially hour-glass shape and corresponds to a projection of the valves 12 and 13 connected by a restricted neck. It will be noted from Fig. 1, that the edge of wall 6 extending about the lower portion of the combustion chamber is comparatively sharp so as to cause an abrupt change in the direction of flow of gases forced from the cylinder into the combustion chamber in the compression stroke of the piston. This, in conjunction with the upward flaring of the combustion chamber and the shape thereof in horizontal section, contributes to high turbulence of the fuel mixture, which is desirable.

The flaring of the combustion chamber around the valve openings promotes a smooth and easy flow of the gases through the ports, with resulting high volumetric efficiency and thorough scavenging. This is advantageous as promoting high power and cooler parts.

Head 4 is provided with a hollow boss 21 extending inwardly from one side thereof. This boss is connected, by a reduced and interiorly threaded sleeve 22, to neck 9 of the combustion chamber. A spark plug 23 screws into sleeve 22 and the electrodes of this spark plug are disposed midway between the ends of the combustion chamber and in the restriction of neck 9, that is, between the valves 12 and 13. The spark plug 23 is also preferably disposed at such height in the combustion chamber that the spark gap thereof is approximately at the vertical center of the chamber. The midpoint of the longer axis of the combustion chamber coincides with the axis of the cylinder, as will be clear from Fig. 3, so that, by disposing the spark plug in this manner, the flame travel in the chamber is shorter than would be possible if the spark plug were otherwise disposed. This is advantageous as reducing the tendency to detonation and increasing efficiency and power. The rapid burning caused by short flame travel also reduces the temperature of the parts, particularly the exhaust valve. Also, by disposing the combustion chamber in the manner illustrated and described, the spark plug can be arranged to ignite the charge over the center of the piston, or approximately so, and this spark plug can be effectively water-cooled, as will be clear from Fig. 1.

Figure 4:
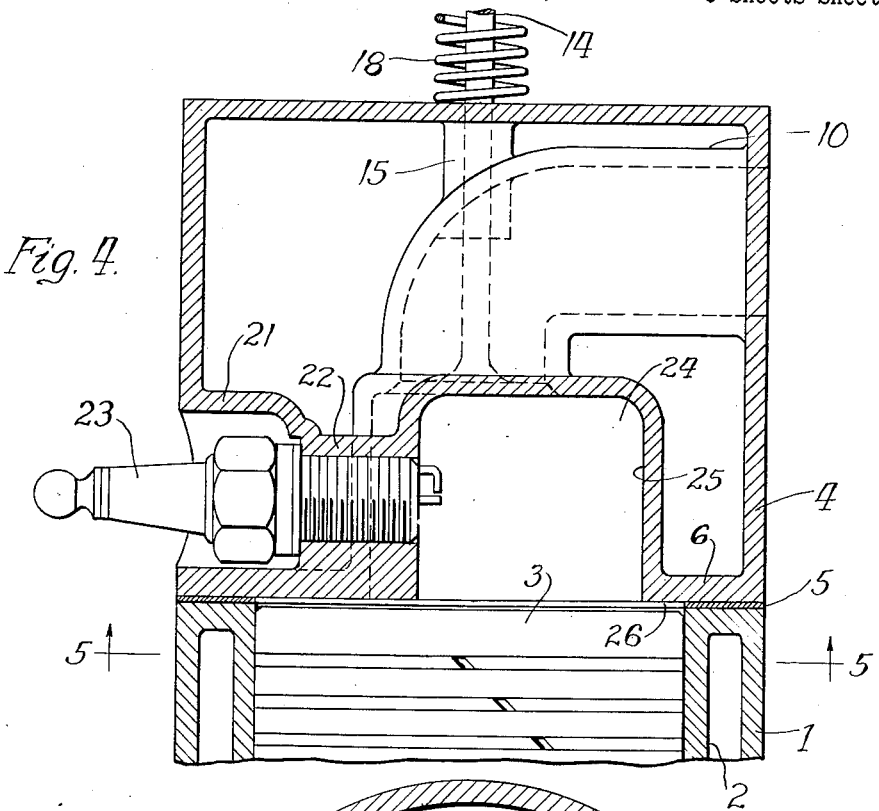
Fig. 4 is a view similar to Fig. 1 showing a modified form of combustion chamber, taken substantially on line 4—4 of Fig. 5.
Figure 5:
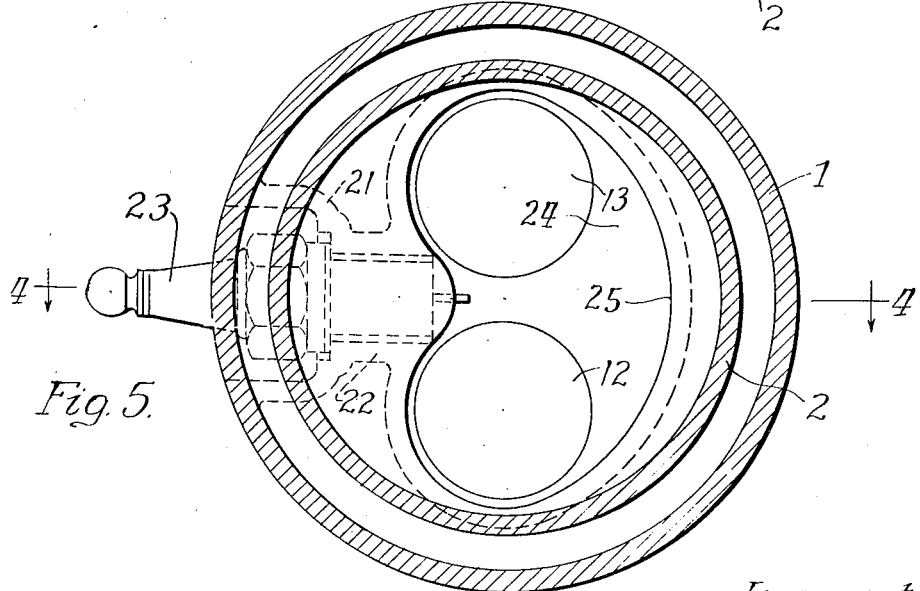
Fig. 5 is a section taken substantially on line 5—5 of Fig. 4, the piston being omitted for clearness of illustration.

In the modified form illustrated in Figs. 4 and 5, I have shown a combustion chamber 24 which does not flare upwardly, the peripheral wall of this chamber being substantially vertical. The side of this chamber adjacent the spark plug and the valves is of the same general shape as the corresponding portion of chamber 7 of Fig. 1, but wall 25 of chamber 24, opposite to the spark plug, is in the shape of an arc disposed substantially concentric with the point of ignition of the charge in the combustion chamber, the radius of this arc being slightly less than the distance between the point of ignition of the charge and either end of the combustion chamber. This means that every point in the combustion chamber is, in a given horizontal plane, within the distance between the point of ignition and the ends of the chamber, which is advantageous as promoting substantially uniform and rapid flame propagation. The combustion chamber 24 is symmetrical, and the combustion chamber 7 is also symmetrical and, like chamber 24, so constructed as to obtain uniform and rapid flame propagation with a minimum length of flame travel. The flame travel in both forms of my invention is less than in any other known combustion chamber of the same type. This is a great advantage.

In both forms of my invention, when the piston 3 is in the position of greatest compression, illustrated in Figs. 1 and 4, its upper face is disposed in close proximity to the under face of wall 6 of the head, the clearance space 26 between this wall and the piston being the minimum required for mechanical reasons, and providing a shielded space or area which is of such small volume, relative to the area of the walls of the piston and engine head with which the fuel charge in this space is in contact, that the fuel charge in space 26 is non-effective, from the standpoint of combustion.

The combustion chamber thus constitutes all of the effective combustion space when the piston is in the position of greatest compression. As the piston moves upwardly, during the compression stroke, the fuel mixture displaced thereby is forced into the combustion chamber and high turbulence results due to the change in direction of flow of this mixture as it enters the chamber. High turbulence is also caused by the high initial velocity of the fuel mixture displaced from between the piston and the under face of wall 6, as the piston approaches the position of greatest compression.

What I claim is:—

1. In an internal combustion engine, a cylinder, a piston reciprocating in the cylinder, a head having a lower wall and a combustion chamber opening therethrough and overlying the central portion of the cylinder area, the under face of said wall about the combustion chamber being in close proximity to the upper face of the piston, when said piston is in the position of greatest compression, fuel mixture inlet and burnt gas outlet passages opening through the roof of the chamber, valves controlling said passages, said chamber flaring upwardly, and spark means for igniting the fuel charge in the chamber.

2. In an internal combustion engine, a cylinder, a piston reciprocating in the cylinder, a head having a lower wall and a combustion chamber opening restrictedly therethrough and overlying the central portion of the cylinder area, the under face of said wall about the combustion chamber being in close proximity to the upper face of the piston, when said piston is in the position of greatest compression, fuel mixture inlet and burnt gas outlet passages opening through the roof of the chamber, valves controlling said passages, said chamber comprising end portions concentric with the valves and a restricted neck connecting said end portions, and spark means for igniting the fuel charge in said neck.

3. In an internal combustion engine, a cylinder, a piston reciprocating in the cylinder, a head having a lower wall and an upwardly flaring combustion chamber opening therethrough and overlying the central portion of the cylinder area, the under face of said wall about the combustion chamber being in close proximity to the upper face of the piston when said piston is in the position of greatest compression, fuel mixture inlet and burnt gas outlet passages opening through the roof of the chamber at the ends thereof, valves controlling the passages, said chamber comprising end portions concentric with the valves and a restricted neck connecting said end portions, and spark means for igniting the fuel charge in the neck.

In witness whereof, I hereunto subscribe my name this 24th day of January, 1930.

HARRY L. HORNING.